(12) United States Patent
Zeuner et al.

(10) Patent No.: US 12,007,597 B2
(45) Date of Patent: Jun. 11, 2024

(54) OPTICAL DEVICE FOR CONTROLLING LIGHT

(71) Applicant: VITREALAB GMBH, Vienna (AT)

(72) Inventors: Jonas Zeuner, Vienna (AT); Chiara Greganti, Vienna (AT)

(73) Assignee: VITREALAB GMBH, Vienna (AT)

( * ) Notice: Subject to any disclaimer, the term of this patent is extended or adjusted under 35 U.S.C. 154(b) by 0 days.

(21) Appl. No.: 18/247,921

(22) PCT Filed: Feb. 1, 2022

(86) PCT No.: PCT/EP2022/052329
§ 371 (c)(1),
(2) Date: Apr. 5, 2023

(87) PCT Pub. No.: WO2022/162240
PCT Pub. Date: Aug. 4, 2022

(65) Prior Publication Data
US 2023/0375769 A1    Nov. 23, 2023

(30) Foreign Application Priority Data
Feb. 1, 2021 (EP) ...................... 21154580

(51) Int. Cl.
*F21V 8/00* (2006.01)
(52) U.S. Cl.
CPC ......... *G02B 6/0036* (2013.01); *G02B 6/0076* (2013.01)
(58) Field of Classification Search
CPC .................. G02B 6/0036; G02B 6/0076
See application file for complete search history.

(56) References Cited

U.S. PATENT DOCUMENTS

| 2007/0086712 | A1 | 4/2007 | Shani |
| 2021/0157443 | A1 | 5/2021 | Zeuner et al. |
| 2021/0215857 | A1* | 7/2021 | Nichol ................. G02B 5/0257 |

FOREIGN PATENT DOCUMENTS

| EP | 3 599 541 A1 | 1/2020 |
| WO | 2007/046100 A2 | 4/2007 |

OTHER PUBLICATIONS

Innovation Q+ NPL Search (Year: 2023).*
International Search Report issued in corresponding application, PCT/EP2022/052329; Mailing date: Mar. 18, 2022.
Written Opinion issued in corresponding application, PCT/EP2022/052329; Mailing date: Mar. 18, 2022.
Extended European Search Report issued in application, 21154580.1-1001; dated Jul. 9, 2021.

* cited by examiner

*Primary Examiner* — Anabel Ton
(74) *Attorney, Agent, or Firm* — Pearne & Gordon LLP

(57) ABSTRACT

Optical device for controlling light includes: a substrate with a boundary surface and with a border region contacting the boundary surface, a waveguide formed within the substrate for guiding a light beam, and an optical structure, wherein the waveguide bends towards the boundary surface of the substrate for directing the light beam at the optical structure, wherein the border region is arranged at least partially in an optical path between the waveguide and the optical structure, and wherein there is provided for a contact structure contacting the border region at the boundary surface, wherein the contact structure has a refractive index, which is lower than the refractive index of the substrate in the border region.

14 Claims, 7 Drawing Sheets

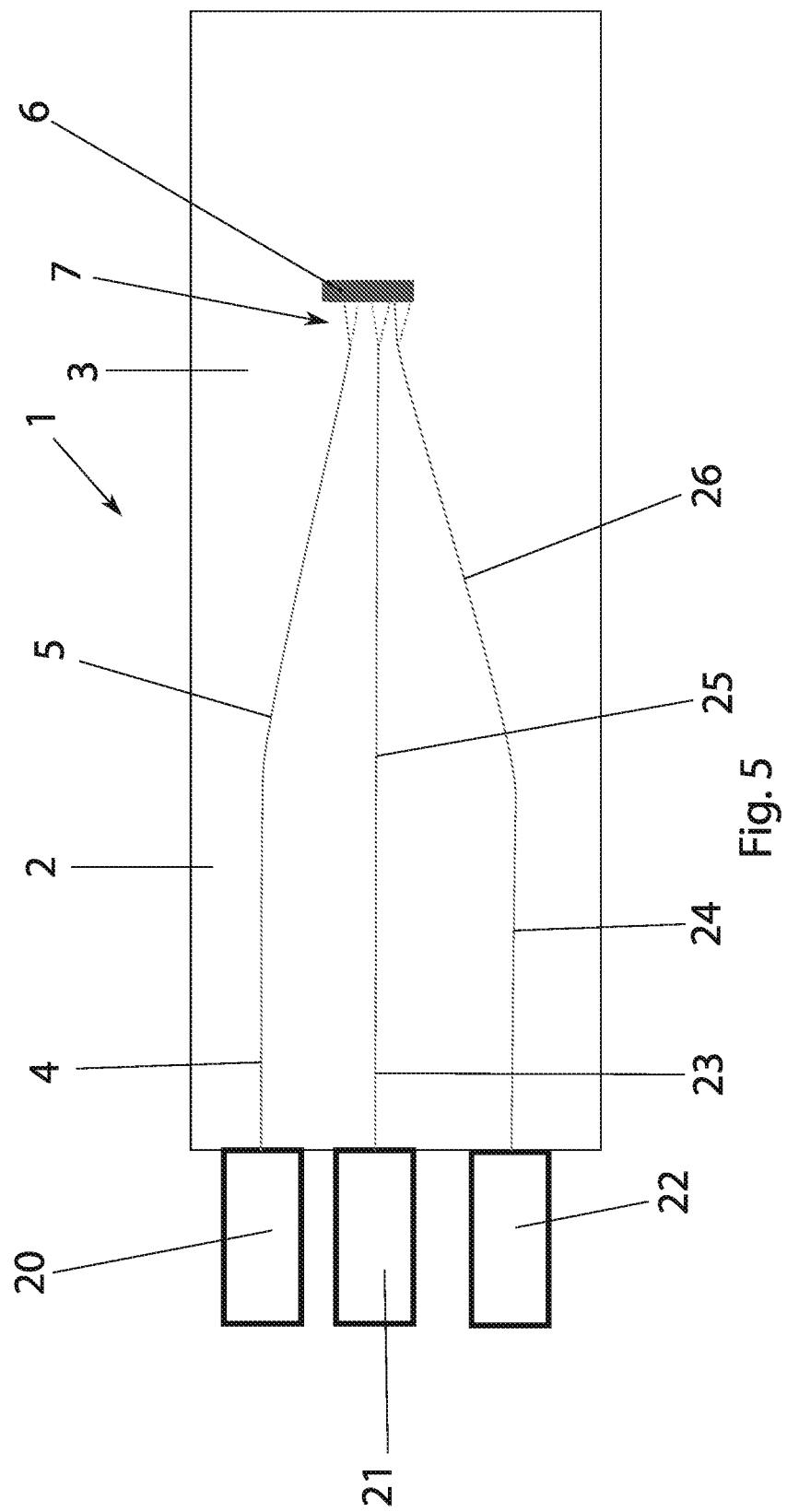

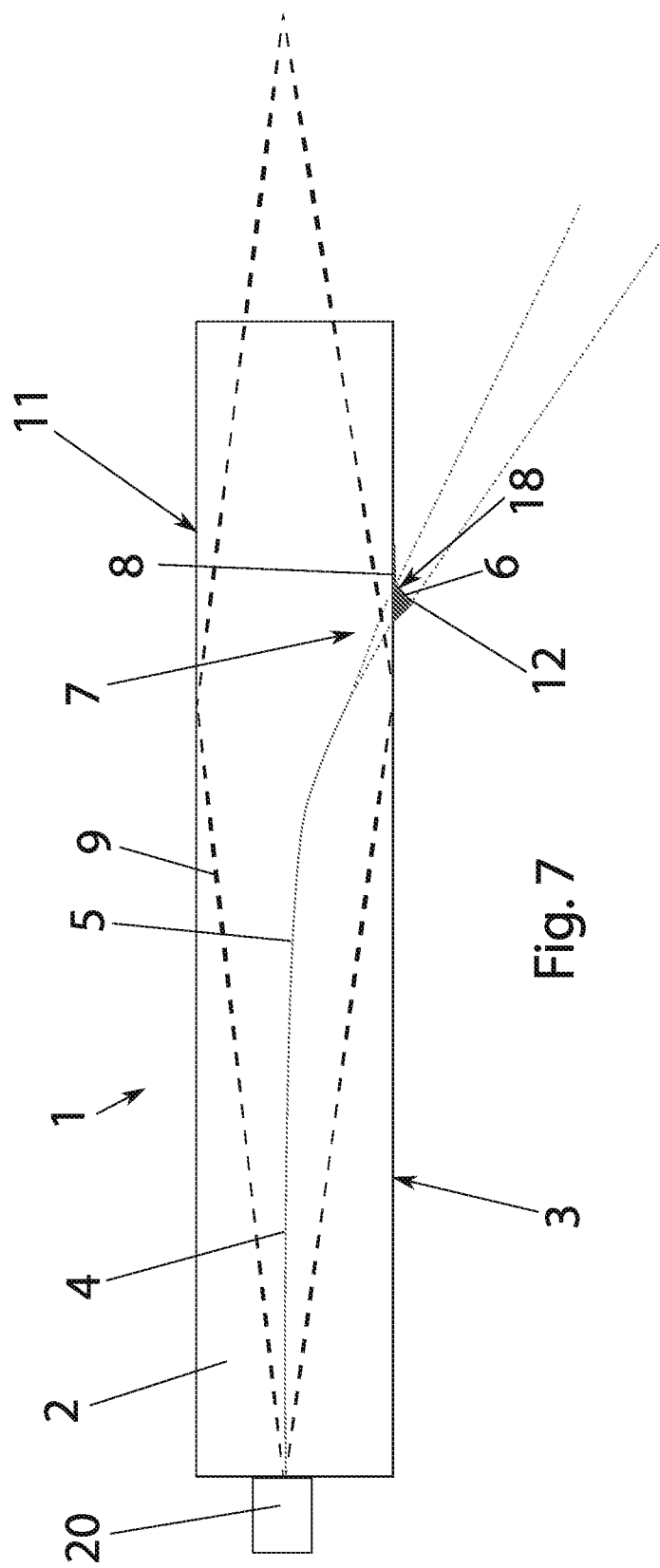

OPTICAL DEVICE FOR CONTROLLING LIGHT

CROSS-REFERENCE TO RELATED APPLICATIONS

This application is a U.S. National Stage entry of PCT/EP2022/052329, filed Feb. 1, 2022, which claims benefit of priority to European application 21154580.1, filed Feb. 1, 2021, the entire disclosures of which are hereby incorporated herein by reference.

FIELD OF THE INVENTION

The disclosure concerns an optical device for controlling light comprising a substrate with a boundary surface and with a border region contacting the boundary surface, a waveguide formed within the substrate for guiding a light beam, and an optical structure, wherein the waveguide bends towards the boundary surface of the substrate for directing the light beam at the optical structure, wherein the border region is arranged at least partially in an optical path between the waveguide and the optical structure.

BACKGROUND OF THE INVENTION

WO 2007/046100 A2 shows a backlight assembly for feeding illuminating light to a passive display panel.

Further, it is known to use waveguides formed in a substrate for distributing light from an external light source. EP 3599541 A1 shows such an optical device, wherein waveguides formed in the substrate by means of direct laser writing extend through the substrate before curving toward a surface of the substrate and terminating at an output within the substrate. In one embodiment, the waveguides bend sharply enough such that light is emitted from the waveguides substantially perpendicularly to the surface. Thus, total internal reflection of the light emitted by the waveguides at the surface formed by the substrate-air boundary does not pose a problem. In another embodiment, the waveguides can direct the light under a shallower angle at the surface. There is provided for an optical structure in the form of wedges in the substrate, which reflect the light such that it reaches an opposite surface of the substrate substantially perpendicularly. In this way, sharp bends as necessary in the other embodiment, which lead to an increase of light losses, can be avoided. Also, the thickness of the substrate can be reduced, taking into account the minimal bending radius of the waveguide.

However, in the device mentioned above stray light in the substrate, which is emitted e.g. in a straight section of the waveguide prior to the bend and which may also result from the coupling of light into the waveguide, reaches the optical structure and is emitted together with the useful light. Therefore, it degrades the quality of the light provided by the optical device. Thus, it would be advantageous to provide the optical structure outside of the substrate.

It would also be advantageous to not have to provide the optical structure as part of or inside the substrate, since a separate optical structure could be provided more easily and more precisely.

BRIEF SUMMARY OF THE INVENTION

It is an objective of the present disclosure to resolve or alleviate at least one or more of the problems in the prior art. In particular, the present disclosure shall provide an optical device with an increased quality of the light the optical device provides, wherein more particularly less stray light shall be emitted together with useful light.

The disclosure proposes an optical device as mentioned in the outset, wherein there is provided for a contact structure contacting the border region at the boundary surface, wherein the contact structure has a refractive index, which is lower than the refractive index of the substrate in the border region.

Stray light includes at least light scattered from the waveguide prior to the bend of the waveguide or along the bend, before the waveguide terminates. Useful light is defined as the light that is coupled into the waveguide, guided by the waveguide and directed by the waveguide at the optical structure. The light that is lost during the propagation inside the waveguide has an angle distribution similar to the light propagating inside the waveguide. Thus, at least the stray light scattered from the waveguide prior to the bend reaches the boundary surface under a shallower angle than the useful light. Due to the contact structure having a refractive index which is lower than the refractive index of the substrate in the border region, total internal reflection occurs at the boundary surface contacted by the border region. Thus, a higher fraction of stray light than useful light will be totally internally reflected and can, therefore, be prevented from being emitted from the substrate at the boundary surface in the border region and can also be prevented from reaching the optical structure. At the same time, a higher fraction of useful light is able to pass the boundary surface and reach the optical structure than if the boundary surface at the border region was merely a substrate-air-boundary. Thus, noise emitted by the optical device can be reduced or cancelled.

In general, stray light originates from optical losses along the desired light beam paths. Another contribution to stray light is light that is imperfectly coupled into the waveguide (e.g. from an external light source). This non-coupled light will propagate in the substrate. Typically, this light will have similar angles to the emission angle from a facet of the waveguide since this is the requirement to achieve a good coupling performance (mode-matching). As a first order approximation, it can therefore be said that the stray light originating at the coupling point is identical to the emission from the waveguide itself (if it would terminate there). Thus, it can be assumed that the angular distribution of stray light resulting from coupling and from propagation is similar. The half-angle of emission of a single-mode Gaussian beam is e.g. ca. 4° for red, green and blue light. Losses introduced by the waveguide itself are typically 0.1 dB/cm but can be higher in bended parts of the waveguide.

The waveguide may bend towards the boundary surface by between 1° and 90°, optionally by between 8° and 90°, e.g. by 12°. Optionally, the waveguide emits light towards the boundary surface under an angle of between 1° and 90°, optionally of between 8° and 90°, e.g. of 12° (as measured from the boundary surface).

The refractive index of the contact structure being lower than the refractive index of the border region refers to the refractive index of the contact structure being lower than the refractive index of the border region for at least one wavelength in the range from 100 nm to 1625 nm or for all wavelengths in said range or at least for the principal refractive index. Optionally, it applies for at least one wavelength in the range from 380 nm to 750 nm or for all wavelengths in said range, further optionally for a wavelength of at least one of 450 nm, 520 nm and 638 nm. In general, references to the refractive index (including the refractive index difference, refractive index ratio and critical angle) in this disclosure refer to these being at least one wavelength in the range from 100 nm to 1625 nm, optionally these being at least one wavelength in the range from 380 nm to 750 nm, further optionally these being at a wavelength of at least one of 450 nm, 520 nm and 638 nm or at least for the principal refractive index. The references to the refractive index (including the refractive index difference, refractive index ratio and critical angle) in this disclosure refer to a measurement at 20° C. Optionally, the references to the refractive index (including the refractive index difference, refractive index ratio and critical angle) apply for measurements over the temperature span from 0° C. to 70° C., over the temperature span from −40° C. to 85° C., or over the temperature span from −55° C. to 125° C. The refractive index for raw optical glass is optionally measured according to ISO 12123:2018 ("Optics and photonics Specification of raw optical glass") and for plastics according to ISO 489: 1999 ("Plastics Determination of refractive index") and for non-raw optical glass (i.e. where ISO 12123:2018 does not apply) according to ISO 21395-1:2020. The refractive index of the contact structure is in particular larger than the refractive index of air.

A ratio of the refractive index of the contact structure and the refractive index of the border region is optionally less than 0.9995, further optionally less than 0.999, further optionally less than 0.998, further optionally less than 0.996. The ratio of the refractive index of the contact structure and the refractive index of the border region is optionally more than ⅔ optionally more than 0.7, further optionally more than 0.8, further optionally more than 0.9, further optionally more than 0.95. A refractive index difference of the refractive index of the contact structure and the refractive index of the substrate in the border region is optionally less than 0.5, further optionally less than 0.1, further optionally less than 0.02. A refractive index difference of the refractive index of the contact structure and the refractive index of the substrate in the border region is optionally more than 0.0002, further optionally more than 0.001, further optionally less than 0.005.

The critical angle is the smallest angle of incidence that yields total reflection. For light waves incident from an "internal" medium (i.e. the substrate) with a refractive index $n_1$ to an "external" medium (i.e. the contact structure) with a refractive index $n_2$, the critical angle is given by $\theta_c = \arcsin(n_2/n_1)$, wherein the critical angle is measured from the normal of the boundary, is defined since $n_2 < n_1$. The critical angle at the boundary surface contacted by the border region is optionally less than 89.5°, further optionally less than 88°, further optionally less than 85°. A lower critical angle allows a higher fraction of stray light to be reflected at the boundary surface and thus to be confined within the substrate. The critical angle at the boundary surface contacted by the border region is optionally more than 10°, further optionally more than 45°, further optionally more than 70°, further optionally more than 78°. A higher critical angle allows more useful light to pass the boundary surface contacted by the border region thus reaching the optical structure. Consequently, a higher critical angle allows the waveguide to direct light at the boundary surface under a shallower angle, thereby reducing the required bending radius of the waveguide toward the boundary surface. The higher the angle difference between useful light and stray light is, the better the separation between the two works.

In a typical embodiment, stray light may be scattered from the waveguide under an angle of 4°. I.e., if the waveguide runs parallelly to the boundary surface prior to the bend, the stray light scattered prior to the bend reaches the boundary surface under an angle of 4° (as measured from the boundary surface, or 86° as measured from the normal of the boundary surface). Also typically, the waveguide may bend towards the boundary surface by 12° (as measured from the boundary surface, or 78° as measured form the normal of the boundary surface). Thus, the useful light reaches the boundary surface under an angle of 12°, or between 8° and 16° taking into account the spread of the light emitted from the waveguide. Therefore, it is advantageous if the critical angle is between 86° and 78°, in particular between 86° and 82°, for example in this typical embodiment.

Optionally, the substrate is transparent. Optionally, the substrate comprises glass, in particular borosilicate glass. Optionally, the substrate is a Corning EAGLE XG®, which is an alkaline earth boro-aluminosilicate glass type, with a refractive index of ca. 1.5 (in the visible range), in particular with a refractive index of 1.5185 at 450 nm, of 1.5134 at 520 nm and of 1.5080 at 638 nm. Then (in particular in the typical embodiment mentioned above) it is advantageous if the contact structure has a refractive index 1.5105 at 450 nm, of 1.5054 at 520 nm and of 1.5000 at 638 nm. The contact structure optionally comprises a resin and/or a polymer. Optionally, the contact structure comprises a UV nanoimprinted polymer. Nanoimprinting allows for high surface quality and cheap mass-producibility. It is well known that the refractive index of the polymer can be adjusted to match the specific needs of nanoimprinted structures.

The border region can, but does not necessarily cover the whole boundary surface. Optionally, the refractive index of the substrate is uniform, i.e. optionally border region and the rest of the substrate have the same refractive index. Optionally, the boundary surface is substantially plane at least in the area contacted by the border region. Optionally, the boundary surface is a first boundary surface and the substrate comprises a second boundary surface opposite the first boundary surface. Optionally, the second boundary surface is substantially parallel to the first boundary surface. Reference to the boundary surface of the substrate refers to the first boundary surface of the substrate. Optionally, the substrate has the form of a slab. Optionally, the substrate's extension perpendicularly to the boundary surface is at least 10 times smaller than the substrate's extension in directions parallel to the boundary surface. Optionally, the second boundary surface is a substrate-air boundary. Optionally, the substrate contacts at the second boundary surface a material (e.g. air) with a refractive index that is lower than the refractive index of the substrate in a second border region contacting said material. Thus, stray light can be reflected at both sides of the substrate and, therefore, be confined within the substrate. A ratio of the refractive index of said material and the refractive index of the second border region is optionally less than 0.9, further optionally less than 0.8, further optionally less than 0.7. Thus, practically all stray light can be totally internally reflected at the second boundary surface. The refractive index difference at the second boundary surface can be lower than that at the first boundary surface, since useful light does not need to be emitted under a shallow angle. Alternatively, the second boundary surface may be contacted by an absorptive material.

The border region being arranged at least partially in an optical path between the waveguide and the optical structure means that a light beam emitted from the waveguide towards the optical structure passes through the border region. The border region being arranged at least partially in an optical path between the waveguide and the optical structure refers to this being the case for at least one wavelength in the range from 100 nm to 1625 nm, optionally for at least one wavelength in the range from 380 nm to 750 nm, further optionally for a wavelength of at least one of 450 nm, 520 nm and 638 nm. Alternatively or additionally to being at least partially arranged in an optical path between the waveguide and the optical structure, the border region may be arranged geometrically at least partially between the waveguide and the optical structure. The waveguide may direct the light beam at the optical structure such that the light beam propagates freely at least between the waveguide and the boundary surface in the substrate and/or propagates freely at least through the border region.

In particular, the optical structure is adjacent to the boundary surface. The contact structure may be provided by the optical structure. I.e., the contact structure may be a part of the optical structure. The contact structure and the rest of the optical structure (if they are integral, i.e., formed in one piece) or the contact structure and the optical structure (if they are not integral) may have the same refractive index.

Optionally, the waveguide directs the light beam under an emitting angle at the boundary surface and a refractive index difference of the refractive index of the contact structure and the refractive index of the substrate in the border region is such that the critical angle of the boundary surface on the substrate's side is larger than the emitting angle, wherein the emitting angle and the critical angle are measured from a normal of the boundary surface. Thus, a larger fraction of the useful light emitted by the waveguide is able to leave the substrate and reach the optical structure. Optionally, the critical angle of the boundary surface on the substrate's side is larger than the emitting angle by at least 1°, further optionally by at least 2°, further optionally by at least 4°. Thus, taking into account the spread of the light beam emitted from the waveguide, an even larger fraction of the useful light can pass the boundary surface. In particular, the emitting angle is defined using the beam centroid of the light beam.

The waveguide is optionally formed within the substrate by means of direct laser writing, in particular femtosecond direct laser writing.

Optionally, a refractive index difference of the refractive index of the contact structure and the refractive index of the substrate in the border region is such that the critical angle of the boundary surface on the substrate's side is smaller than the critical angle of a boundary of the waveguide with the substrate on the waveguide's side, wherein the critical angle of the boundary surface is measured from a normal of the boundary surface and the critical angle of the boundary of the waveguide is measured from a normal of the boundary of the waveguide. Typically, stray light is scattered from a waveguide under an angle larger than the critical angle inside the waveguide. Such stray light will be totally internally reflected at the boundary surface contacted by the contact structure (as long as the stray light's angle is larger than the critical angle of the boundary surface).

Optionally, a refractive index difference of the refractive index of the contact structure and the refractive index of the substrate in the border region is between 0.0001 and 0.1.

Optionally, the contact structure has a different refractive index than a material of the optical structure. In particular, the contact structure may be used between the optical structure and the substrate for adhering the optical structure on the substrate, e.g. as a glue. The contact structure may be a layer, which optionally may be less than 100 µm thick.

Optionally, the optical structure comprises a reflection interface for reflecting the light beam directed at the optical structure by the waveguide, in particular towards the boundary surface of the substrate, wherein the reflection interface is optionally provided by a reflective coating, e.g. silver. Thus, the waveguide can direct the light beam under a shallow angle at the boundary surface and only requires a small bending angle. The reflection interface allows to reflect the light beam back at the substrate such that it may leave the substrate at the opposite side (in particular at the second boundary surface) under an essentially arbitrarily defined angle. In particular, the light beam can be emitted from the substrate (in particular at the second boundary surface) substantially perpendicularly. Also, the reflection interface can shape the light beam. The reflection interface is for reflecting the light beam directed at the optical structure by the waveguide towards the boundary surface of the substrate under an angle from the normal of the boundary surface of optionally less than 45°, further optionally less than 30°, further optionally less than 15°. In particular, the reflection interface is arranged such that an incidence angle of the light beam is such that the light beam is reflected towards the boundary surface of the substrate under an angle from the normal of the boundary surface of optionally less than 45°, further optionally less than 30°, further optionally less than 15°. The reflection interface is in particular provided by a boundary surface of the optical structure, in particular a boundary surface facing away from the substrate. I.e., the light beam enters the optical structure and is reflected back at the optical structure's opposite boundary surface. Optionally, at least 80% of the light beam (in terms of energy) is reflected at the reflection interface (in particular in the desired direction range). Alternatively, the reflection interface can also be used to reflect light in a direction away from the boundary surface, in particular if used in combination with the transmission interface mentioned below.

Optionally, the optical structure comprises a transmission interface arranged such that the light beam directed at the optical structure is emitted from the transmission interface. The transmission interface is optionally different from the boundary surface of the structure, in particular if the optical structure comprises the contact structure. The transmission interface is in particular provided by a boundary surface of the optical structure, in particular a boundary surface facing away from the substrate. Optionally, the transmission interface may be for refracting a light beam transmitted across the transmission interface such that the light beam is emitted under an angle from the normal of the boundary surface of the substrate of optionally less than 45°, further optionally less than 30°, further optionally less than 15°, further optionally substantially perpendicularly to the boundary surface. Thus, the waveguide can direct the light beam under a shallow angle at the boundary surface and only requires a small bending angle. The transmission interface allows to emit the light beam under an essentially arbitrarily defined angle, e.g. substantially perpendicularly to the boundary surface. Optionally, at least 80% of the light beam (in terms of energy) is transmitted at the transmission interface (in particular in the desired direction range). The transmission interface can be used as an alternative or in combination with the reflection interface. The reflection interface may be provided such that light transmitted through the transmission interface impinges on the reflection interface. Here, the reflection interface can for example serve to reflect the light beam transmitted through the transmission interface such that it is emitted from the optical device perpendicularly to the boundary surface.

Optionally, the optical structure comprises an optical shaping unit and the waveguide is configured for directing the light beam at the optical shaping unit, wherein the optical shaping unit is configured to reduce the beam divergence of the light beam directed at it. The optical shaping unit may be provided by the reflection interface and/or the transmission interface. The beam divergence is reduced along at least one axis of the light beam. The beam divergence being reduced means that the beam divergence angle is reduced. The beam divergence angle is a measure for the increase of the beam width or beam diameter with increasing distance from the beam waist locations and are defined as given in ISO 11146-1 (First edition, 2005 Jan. 15), in particular in section 3.15 of said documentation, for stigmatic and simple astigmatic beams; for general astigmatic beams the respective definition from ISO 11146-2 and ISO 11146-3 is applicable. Optionally, the beam divergence angle is reduced for both principal axes of the beam. The beam divergence angle is reduced by optionally at least 1°, further optionally at least 10°, further optionally at least 20°, for at least one axis, optionally both/all axes, of the light beam. Optionally, the divergence angle is reduced such that the light beam emitted the optical shaping unit has a divergence half-angle of less than 10°, further optionally less than 3°, further optionally less than 1°. The optical shaping unit is for example a micro-mirror or a diffractive optical element.

Optionally, the optical device comprises a primary waveguide formed within the substrate for receiving a light beam from an external light source, wherein the primary waveguide is connected or coupled to the waveguide. If the primary waveguide is connected to the waveguide, they may be formed as a single waveguide. In particular, the primary waveguide runs from a side face of the substrate, wherein the primary waveguide receives the light beam from an external light source at the side face. As mentioned above, light that is imperfectly coupled to the primary waveguide is another source of stray light. This non-coupled light will propagate in the substrate. Optionally, the primary waveguide runs substantially straight in the substrate at least to the waveguide. Optionally, the waveguide runs substantially straight in the substrate prior to the bend. Coupling between the primary waveguide and the waveguide can for example be achieved by evanescent coupling.

Optionally, the optical device comprises the external light source. The external light source is optionally a coherent light source, further optionally a laser, further optionally a laser diode.

Optionally, the primary waveguide comprises an interface for receiving the light beam from the external light source and the primary waveguide extends from the interface substantially parallel to the boundary surface. Thus, a higher fraction of stray light from coupling into the primary waveguide and, therefore, from coupling into the waveguide will be reflected at the boundary surface.

Optionally, the waveguide is a first secondary waveguide and the optical device further comprises at least a second secondary waveguide formed within the substrate for guiding a light beam, wherein the primary waveguide is coupled to the second secondary waveguide and the second secondary waveguide bends towards the boundary surface of the substrate for directing the light beam at the optical structure at a different position than the first secondary waveguide. In this way, light can be distributed from an external light source to multiple points. The optical device can then be used to illuminate a larger area, e.g. as a backlight unit. In particular, the border region is also arranged at least partially in an optical path between the second secondary waveguide and the optical structure.

Optionally, the optical shaping unit is a first optical shaping unit and the optical structure comprises at least a second optical shaping unit and the second secondary waveguide directs the light beam at the second optical shaping unit, wherein the second optical shaping unit is configured to reduce the beam divergence of the light beam directed at it. By guiding the light beams in distinct waveguides to the respective optical shaping units, their respective angle of incidence is well-defined and, thus, the optical shaping units can precisely shape the characteristics of the respective light beams. This would not be possible, if the light was messily distributed in a large slab-like substrate, wherein the light would not impinge on optical elements in a well-defined manner, in particular not under a well-defined angle. In this way it is possible with the proposed optical device to provide for a number of collimated beams, without having to purposefully discard a part of the beam and thereby reducing the brightness and wasting energy. With these light beams, small spots (e.g. individual subpixels of a display) can be illuminated. Thus, when used in a display, it is possible to provide a 1-to-1 relationship of waveguides and subpixels; i.e. a light beam leaving a respective secondary waveguide and guided to a respective optical shaping unit illuminates only a single subpixel and, vice-versa, each subpixel is illuminated by a light beam arriving at a respective optical shaping unit from a single secondary waveguide. Furthermore, the optical device provides for the possibility to provide for further collimated beams originating from the same external light source, since further secondary waveguides can be branched off the primary waveguide. I.e., the optical device may comprise further secondary waveguides formed within the substrate for guiding a light beam, wherein the primary waveguide is also coupled to the further secondary waveguides and the further secondary waveguides bend towards the boundary surface of the substrate for directing the light beam at the optical structure. Optionally, the optical device comprises further optical shaping units, wherein each further secondary waveguide directs the light beam at a respective further optical shaping unit and the further optical shaping units are configured to reduce the beam divergence of the light beam directed at each respective further optical shaping unit. Optionally, the optical device comprises at least 10, further optionally at least 100, further optionally at least 1000, further secondary waveguides. Optionally, the optical device comprises at least 10, further optionally at least 100, further optionally at least 1000, further optical shaping units. Optical shaping units may also be shared among multiple subpixels and their respective associated secondary waveguides, i.e. more than one further secondary waveguide may direct light at e.g. the first or the second optical shaping unit (from a different direction than the first/second secondary waveguide). Generally, the first waveguide may receive a light beam from an external light source directly or indirectly, e.g. via one or more additional, intermediate waveguides and/or one or more additional, intermediate optical couplers.

Each optical shaping unit may be provided by the reflection interface and/or the transmission interface. Optionally, each optical shaping unit comprises a mirror, in particular a concave mirror and/or a micro-mirror. Optionally, the first optical shaping unit and/or the second optical shaping unit and/or each of the further optical shaping units collimate(s) and/or refocuses the respective light beam.

Optionally, the optical device comprises at least a further primary waveguide formed within the substrate for receiving a light beam from at least a further external light source, wherein the further primary waveguide is connected to or coupled to at least a further waveguide formed within the substrate for guiding a light beam, wherein the further waveguide bends towards the boundary surface of the substrate for directing the light beam at the optical structure. Thus, light from a different external light source, e.g. of a different color, can be distributed by the optical device. The optional features mentioned in this disclosure in the context of the primary waveguide may also apply to the at least one further primary waveguide. The optional features mentioned in this disclosure in the context of the waveguide may also apply to the at least one further waveguide. In particular, the further waveguide may be another secondary waveguide and there may be provided for another group of further secondary waveguides each coupled to the further primary waveguide and each directing the light beam at a respective one of another group of further optical shaping units. In particular, the border region is arranged at least partially in an optical path between the further waveguide and the optical structure.

The disclosure further concerns a backlight unit comprising the optical device as described herein. With the present disclosure it is possible to distribute the light from an external light source to many pixels (e.g. more than 1000 pixels).

The disclosure further concerns a display panel comprising the optical device as described herein. The display panel is optionally an LCD.

The disclosure further concerns a Y-tritter comprising the optical device as described herein.

BRIEF DESCRIPTION OF THE DRAWINGS

By way of example, the disclosure is further explained with respect to some selected embodiments shown in the drawings. However, these embodiments shall not be considered limiting for the disclosure.

FIG. 5 schematically shows a top view of a third embodiment of the optical device.

FIG. 7 schematically shows a side view of a fourth embodiment of the optical device.

DESCRIPTION OF EXAMPLE EMBODIMENTS

Figure 1:
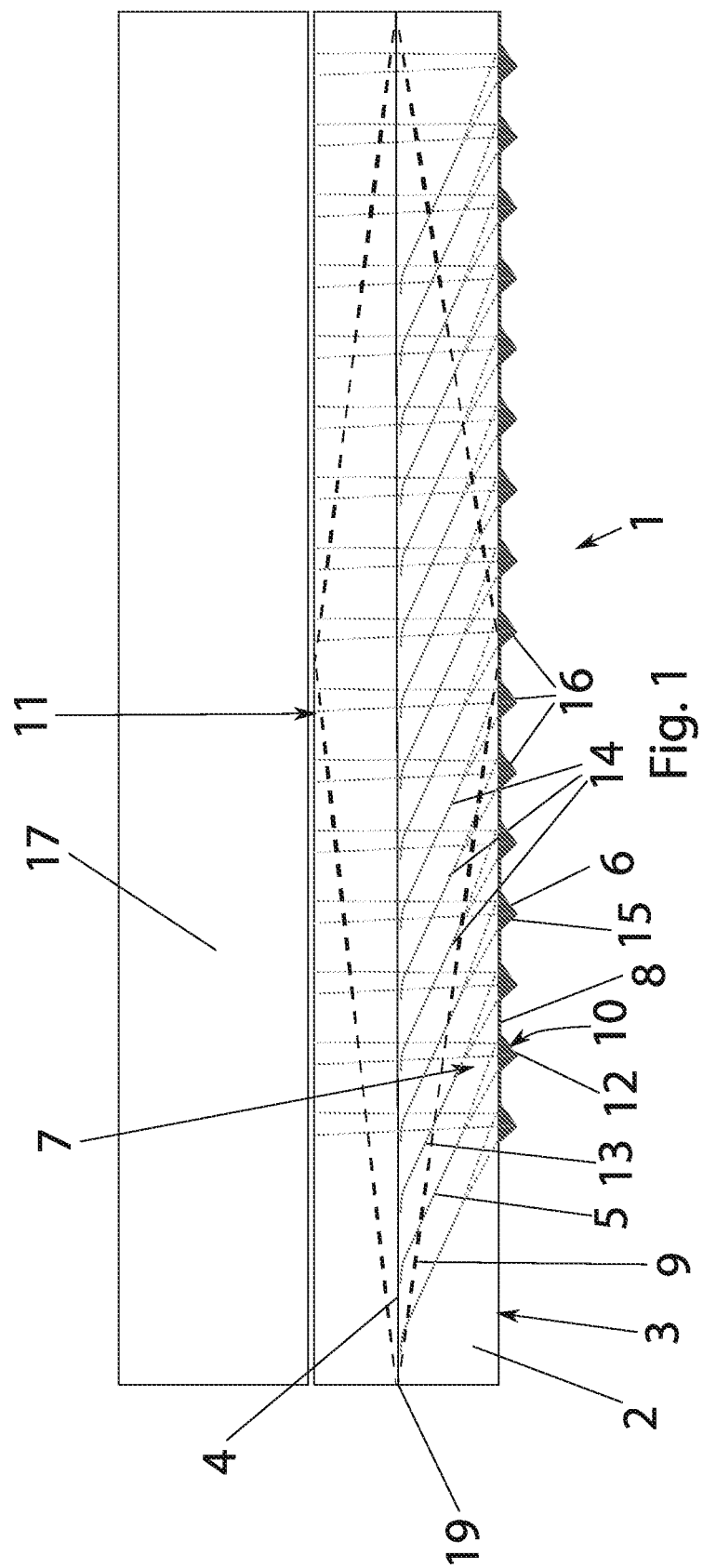
FIG. 1 schematically shows a first embodiment of the optical device with a reflection interface.

FIG. 1 schematically shows a first embodiment of the optical device 1. The optical device comprises a substrate 2 with a boundary surface 3 and an optical structure 6. The optical device 1 comprises a primary waveguide 4 formed within the substrate 2 for receiving a light beam from an external light source (not part of the optical device 1). The primary waveguide 4 comprises an interface 19 for receiving the light beam from the external light source and the primary waveguide 4 extends from the interface 19 substantially parallel to the boundary surface 3. The optical device 1 comprises a waveguide 5, in the following referred to as a first secondary waveguide 5, formed within the substrate 2 for guiding a light beam, wherein the primary waveguide 4 is coupled to the first secondary waveguide 5. The first secondary waveguide 5 bends towards the boundary surface 3 of the substrate 2 for directing the light beam at the optical structure 6. The first secondary waveguide 5 emits light under an emitting angle of e.g. 12°. A border region 7 of the substrate 2 contacting the boundary surface 3 is arranged partially in an optical path between the first secondary waveguide 5 and the optical structure 6. There is provided for a contact structure 8 contacting the border region 7 at the boundary surface 3. In this embodiment, the contact structure 8 is provided as part of the optical structure 6.

Stray light will result in particular from imperfectly coupling light into the primary waveguide 4, from light scattered from the first secondary waveguide 5 prior to the bend and from light scattered from other waveguides (mentioned below). Both the light scattered from imperfect coupling and the light scattered from the waveguides can be assumed to have angles similar to the emission angle from the waveguides at a facet of the waveguides, e.g. approximately 4°. The stray light resulting from imperfect coupling into the primary waveguide 4 is schematically illustrated by dashed lines 9.

The contact structure 8 (and in this embodiment the optical structure 6) has a refractive index, which is lower than the refractive index of the substrate 2 in the border region 7 (and in this embodiment of the substrate 2 as such). Thus, total internal reflection occurs at a critical angle at the boundary surface 3. The refractive index of the contact structure 8 and of the substrate 2 in the border region 7 are such that the critical angle is between the angle of the stray light resulting from the imperfect coupling or from the first secondary waveguide 4 (or other waveguides mentioned below) prior to the bend and the emitting angle of the first secondary waveguide 4. Thus, the stray light is totally internally reflected and does not reach the optical structure 6, whereas the useful light emitted by the first secondary waveguide 5 passes the boundary surface 3 and reaches the optical structure 6.

The optical structure 6 comprises a reflection interface 10 for reflecting the light beam directed at the optical structure 6 by the first secondary waveguide 5 towards the boundary surface 3 of the substrate 2. In particular, the light is reflected such that it is directed substantially perpendicularly at the boundary surface 3. The substrate 2 has the form of a slab and the boundary surface 3 is a first boundary surface, wherein the substrate comprises a second boundary surface 11 opposite of and substantially parallel to the first boundary surface 3. The light reflected from the reflection interface 10 is emitted from the optical device 1 from the second boundary surface 11 substantially orthogonally to the second boundary surface 11.

The optical device 1 comprises an optical shaping unit 12 and the first secondary waveguide 5 is configured for directing the light beam at the optical shaping unit 12. In this embodiment, the optical shaping unit 12 is a mirror provided by the reflection interface 10. The optical shaping unit 12 can be configured to reduce the beam divergence of the light beam directed at it. Thus, the optical device 1 can provide a focused or even collimated light beam.

The optical device 1 further comprises a second secondary waveguide 13 and further secondary waveguides 14 formed with the substrate 2 each for guiding a light beam. The primary waveguide 4 is coupled to the second secondary waveguide 13 and each of the further secondary waveguides 14. Each of the second and the further secondary waveguides 13, 14 bends towards the boundary surface 3 of the substrate 2 for directing the light beam at the optical structure 6, each at a different position. The optical shaping unit 12 is a first optical shaping unit and the optical structure 1 comprises further a second optical shaping unit 15 and further optical shaping units 16. The second secondary waveguide 13 directs the light beam at the second optical shaping unit 15. Each of the further optical shaping units 16 correspond to one of the further secondary waveguides 14 and each of the further secondary waveguides 14 direct the light beam at the respective one of the further optical shaping units 16. The second optical shaping unit 15 and the further optical shaping units 16 are also mirrors and substantially provided by the reflection interface 10. The second optical shaping unit 15 and the further optical shaping units 16 can be configured to reduce the beam divergence of the light beam directed at the respective optical shaping unit 15, 16 and reflect them such that the light beams pass the substrate 2 substantially perpendicularly to the first boundary surface 3 and are emitted from the optical device 1 substantially perpendicular to the second boundary surface 11.

The border region 7 of the substrate 2 contacting the boundary surface 3 is also arranged at least partially in an optical path between the second secondary waveguides 13 and the optical structure 6 and in an optical path between the further secondary waveguides 14 and the optical structure 6.

Thus, the optical device 1 can provide a number of perpendicular light beams, which are focused or even collimated. The optical device 1 may be used in a backlight unit of a display panel, where each light beam may illuminate one (sub)pixel. For this purpose, a liquid crystal display stack 17 can be arranged adjacent to the second boundary surface 11.

Figure 2:
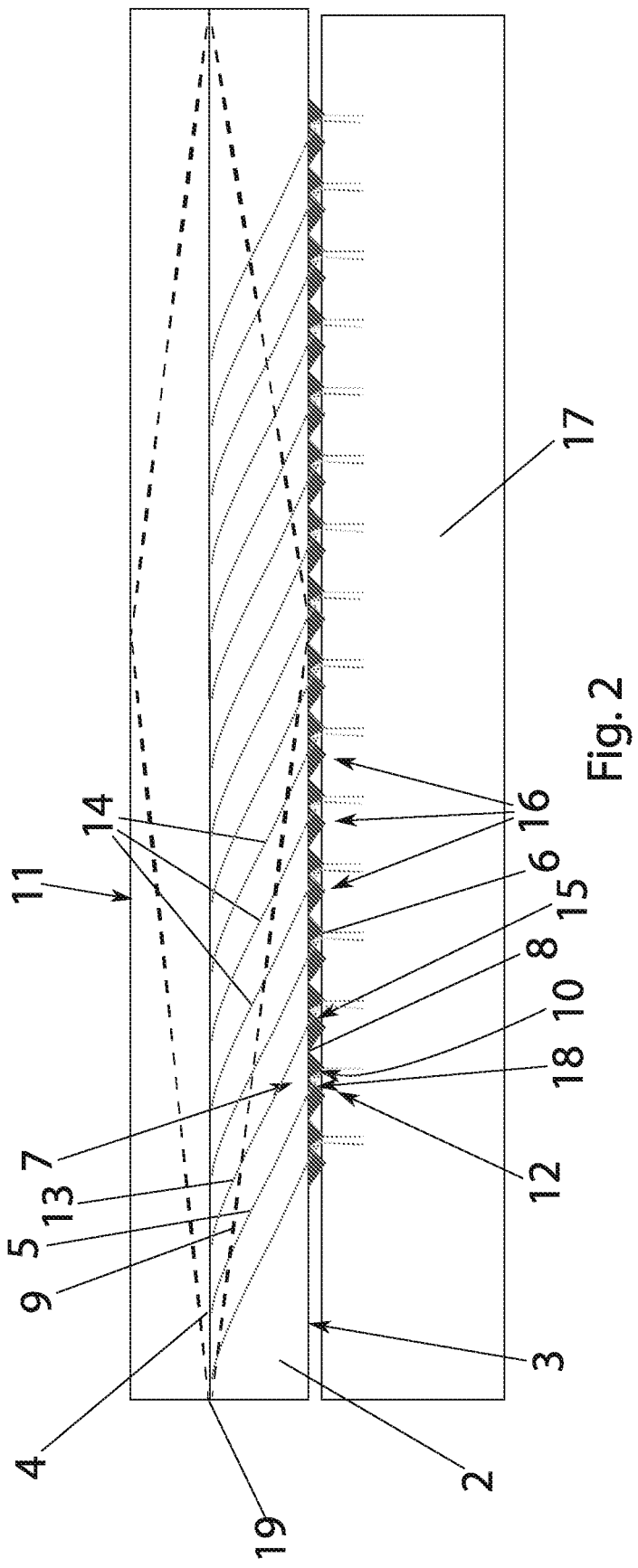
FIG. 2 schematically shows a second embodiment of the optical device with a transmission interface.

FIG. 2 schematically shows a second embodiment of the optical device 1. The second embodiment is similar to the first embodiment. Therefore, similar elements and elements serving similar functions are indicated by the same reference numerals as in the context of the first embodiment and only the differences are pointed out.

In this embodiment, the optical structure 1 comprises a transmission interface 18 different from the first boundary surface 3. The light beams directed by the first, second and further secondary waveguides 5, 13, 14 are transmitted through the transmission interface 18. The transmission interface 18 is a boundary surface between the optical structure and air, resulting in a significant critical angle of total internal reflection. Since the light beam should not be totally internally reflected, the transmission interface is structured such that the light beams impinge on the transmission interface 18 under a less shallow angle than the angle under which they impinge on the first boundary surface 3. Thus, the light beams impinge on the transmission interface 18 under an angle of between 70° and 110°.

The optical structure 6 further comprises a reflection interface 10. The light transmitted through the transmission interface 18 impinges on the reflection interface 10 and is reflected such that it is emitted from the optical device 1 perpendicularly to the first boundary surface 3 (regarding the beam center). Thus, in the second embodiment, the light beam is emitted from the optical device 1 in the opposite direction compared to the first embodiment. Therefore, also the liquid crystal display stack 17 is provided on the opposite side compared to the first embodiment. The reflection interface 10 may be achieved by a partial coating of the optical structure 6 on its face facing away from the first boundary surface 3, whereas the sections of the transmission interface 18 are not coated.

The section of the reflection interface 10 and/or the section of the transmission interface 18 that each light beam is directed at may form a respective first, second and further optical shaping unit 12, 15, 16 that reduces the beam divergence of the respective light beam directed at it. For this purpose, the respective section of the reflection interface 10 and/or the transmission interface 18 can for example be curved.

Figure 3:
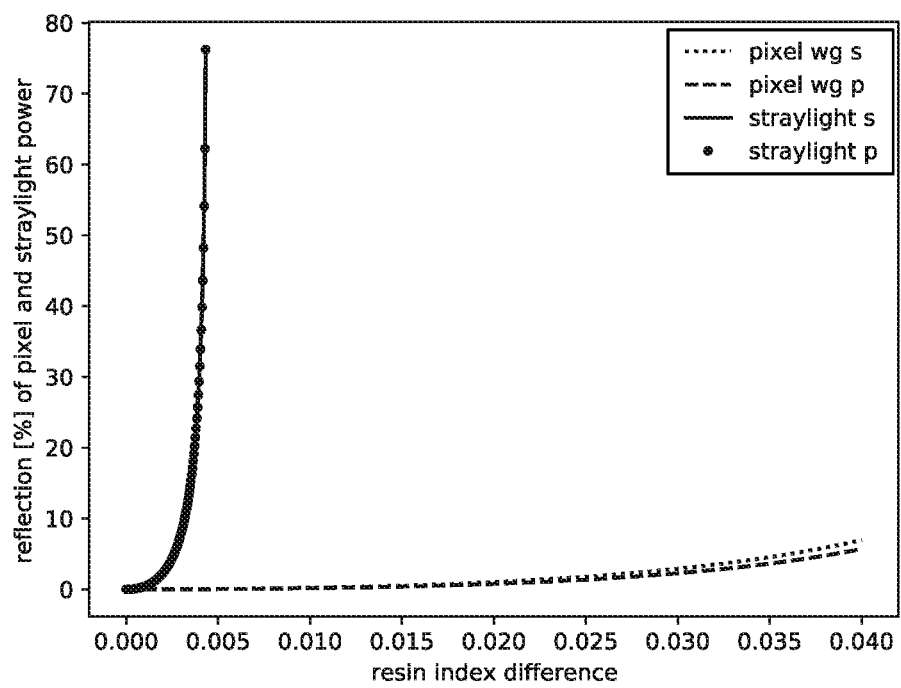
FIG. 3 shows the effect of total internal reflection on s- and p-polarized components of stray light and of useful light.

FIG. 3 illustrates the effect of total internal reflection on s- and p-polarized light of stray light emitted perpendicularly to the first boundary surface 3 with an opening half-angle of 4.35° and of useful light emitted by one of the first, second and further secondary waveguide 5, 13, 14 with an angle of 12° measured to the first boundary surface 3 and an opening half-angle of 4.35°. The refractive index of the substrate 2 in the border region 7 is assumed to be 1.5185 (for a wavelength of 450 nm), 1.5134 (for 520 nm) and 1.5080 (for 638 nm—in the plot all colors are overlapping) and the abscissa shows the refractive index difference of the refractive index of the substrate 2 in the border region and the refractive index of the contact structure 8. The ordinate shows the percentage of the power of the light beams of the useful light and the stray light totally internally reflected at the first boundary surface 3. It can be seen that with a refractive index difference of e.g. 0.008, the useful light and stray light can be separated effectively.

It should be noted that FIG. 3 is an approximate since the half-angle cones used for FIG. 3 are not fully representing the physics of a Gaussian beam, but encompass only 86% of beam power. It may therefore be desirable to create a higher angle difference by adjusting the emitting angles of the secondary waveguides.

Figure 4A:
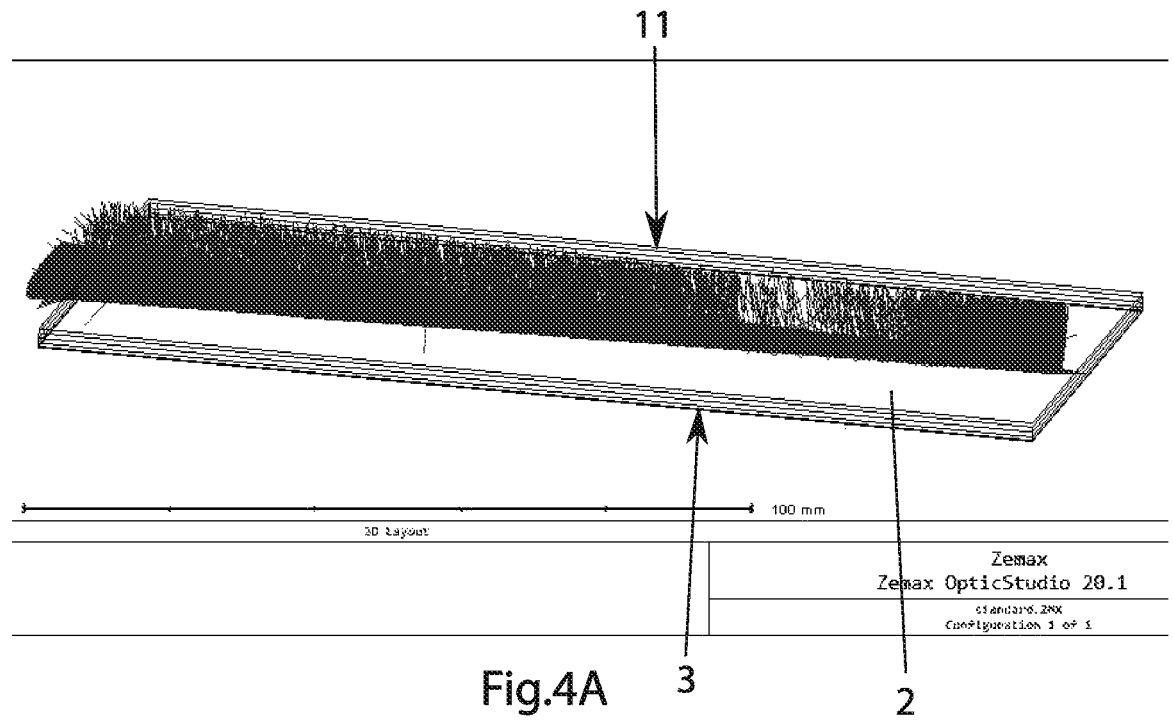
FIG. 4A shows a simulation without stray light cancellation.
Figure 4B:
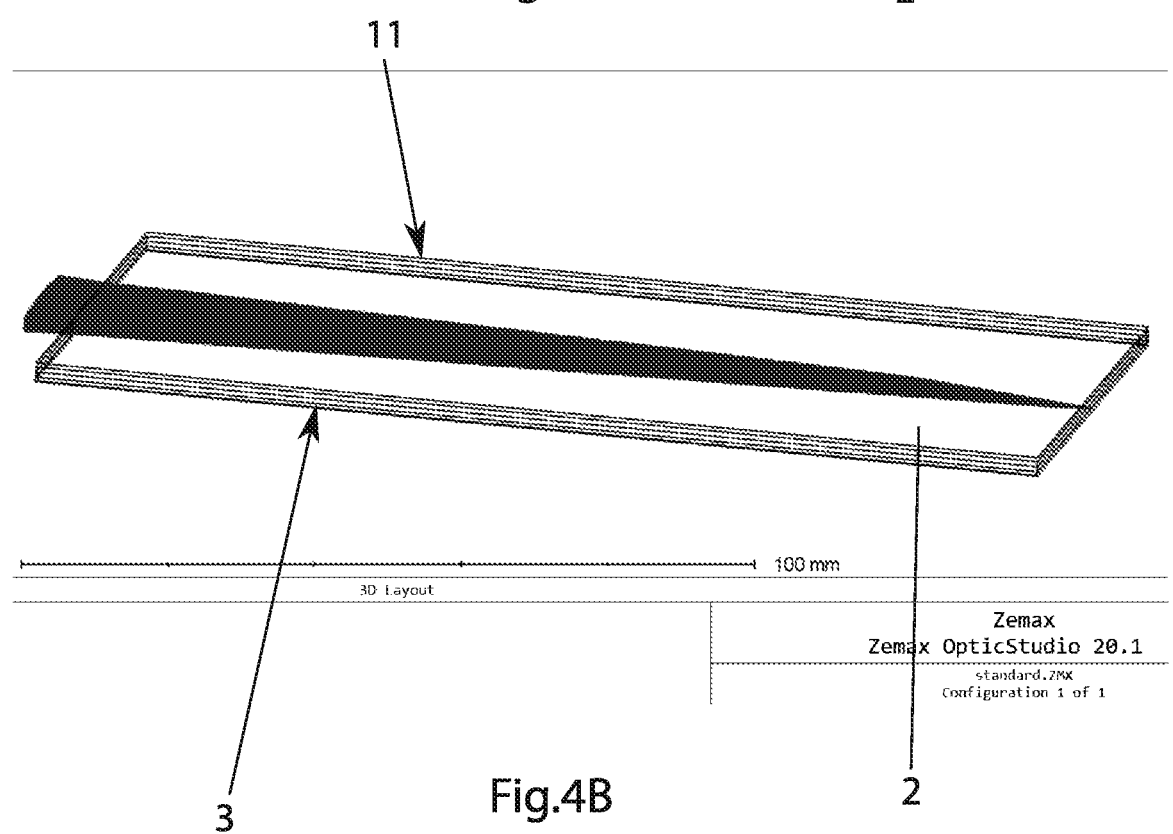
FIG. 4B shows a simulation with stray light cancellation.

FIGS. 4A and 4B each show a simulation of Zemax OpticStudio®. At a facet on the right side of the substrate 2 a stray light source is positioned at 0° and 4.35° half-opening angle. In FIG. 4A, a contact structure (not visible) which has a refractive index larger than the refractive index of the substrate. In FIG. 4B a contact structure (not visible) is used which has a refractive index lower than the refractive index of the substrate. In both cases, the contact structure contacts the first boundary surface 3. The contact structure is part of an optical structure, which comprises micro-mirrors. It can be seen that in FIG. 4A, the stray light reaches the micro-mirrors and, therefore, leaves the optical device 1 at the second boundary surface 11. On the other hand, in FIG. 4B, all stray light is totally internally reflected and leaves the substrate 2 at a facet at the left side, where it can be absorbed.

Figure 6:
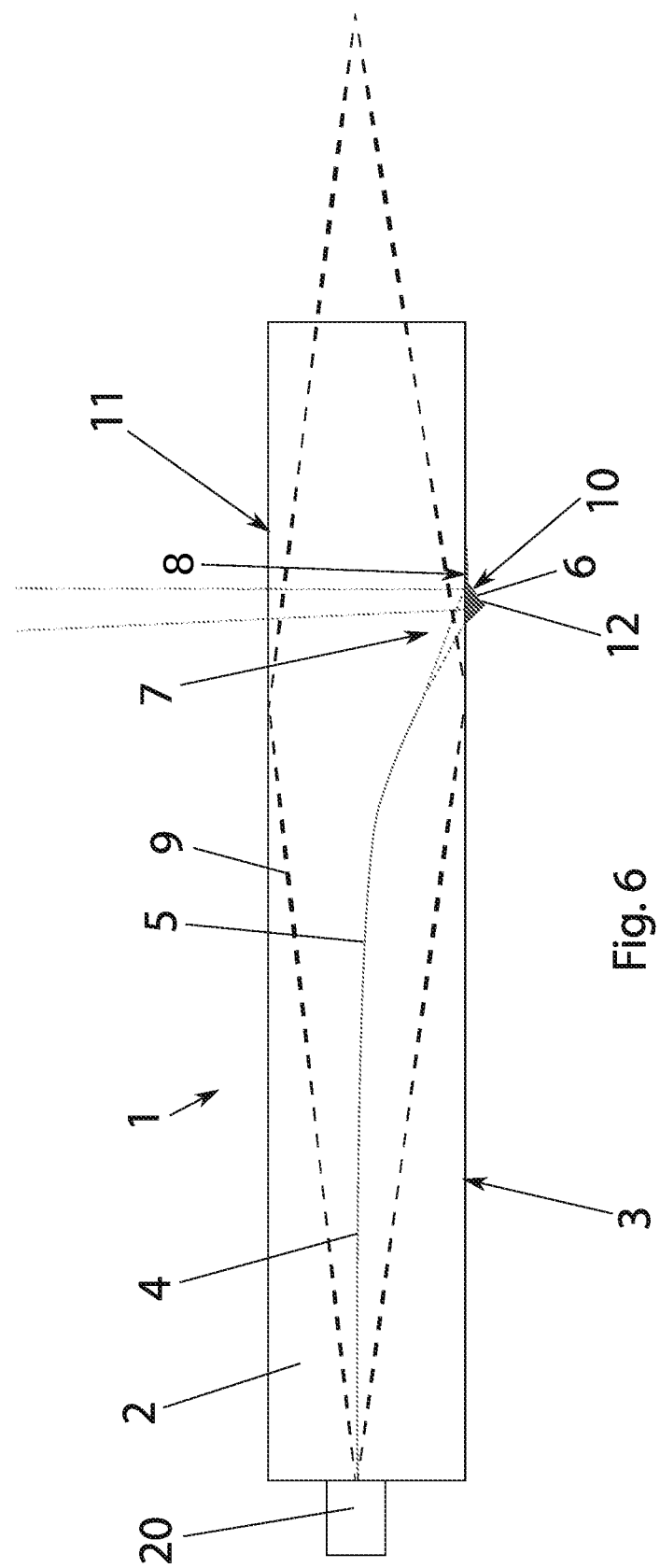
FIG. 6 schematically shows a sectional view of the third embodiment of the optical device according to FIG. 5.

FIG. 5 schematically shows a top view of a third embodiment of the optical device 1 and FIG. 6 schematically shows a sectional view of the third embodiment of the optical device 1 in a section perpendicular to the page plane of FIG. 5.

This embodiment of the optical device 1 is particularly useful as a Y-Tritter, e.g. for head-mounted scanning laser displays. These displays use currently RGB laser diodes closely spaced to each other (>300 μm) and a scanning mirror to project an image into the eye. One problem encountered in these displays is that the larger laser diode spacing decreases image quality and thus the emission spots shall be put as close as possible together. In general, this can be done using the techniques described in EP 3599541 A1. However, such an approach faces the obstacle already described in this disclosure: stray light/noise. Since the laser diodes will couple imperfectly into the waveguides (realistically up to 80%), a significant part of the light will exit the tritter in an unwanted way and decrease image quality. This problem can be solved with the optical device 1 as mentioned in this disclosure, in particular with the optical 1 device 1 according to the third and fourth embodiment.

The optical device 1 of the third embodiment comprises a substrate 2 with a first boundary surface 3 and with a border region 7 contacting the first boundary surface 3. Further, the substrate comprises an optical structure 6. The optical device 1 comprises a first external light source 20, a second external light source 21 and a third external light source 22. There is provided for a first primary waveguide 4 for receiving a light beam from the first external light source 20, a second primary waveguide 23 (i.e. a further primary waveguide) for receiving a light beam from the second external light source 21 and a third primary waveguide 24 (i.e. another further primary waveguide) for receiving a light beam from the third external light source 22. The first, second and third primary waveguides 4, 23, 24 are each formed within the substrate. The first primary waveguide 4 is connected to a first (secondary) waveguide 5. They are in particular formed as a single waveguide. The second primary waveguide 23 is connected to a second (secondary) waveguide 25 (i.e. a further waveguide). They are in particular formed as a single waveguide. The third primary waveguide 24 is connected to a third (secondary) waveguide 26 (i.e. another further waveguide). They are in particular formed as a single waveguide.

Each of the first, second and third waveguides 5, 25, 26 bend towards the boundary surface 3 of the substrate 2 for directing the light beam at the optical structure 6. The border region 7 is arranged at least partially in an optical path between the first waveguide 5 and the optical structure 6, the second waveguide 25 and the optical structure 6, and the third waveguide 26 and the optical structure 6. The optical structure 6 comprises a contact structure 8 contacting the border region 7 at the boundary surface 3. The contact structure 8 has a refractive index, which is lower than the refractive index of the substrate 2 in the border region 7. Thus, stray light 9 will not reach the optical structure 6 and leaves the substrate 2 at the face on the right side.

As can be seen in FIG. 5, the first, second and third waveguide 5, 25, 26 are brought closer to each other, thus that the optical device 1 produces three narrowly spaced light beams. The first waveguide 5 directs the light beam at an optical shaping unit 12 of the optical structure 6 and the second waveguide 25 and the third waveguide 26 each direct the light beam at a respective further optical shaping unit of the optical structure 6. The optical shaping structures 12 are configured to reduce the beam divergence of the light beam directed at them. The optical shaping structures 12 are formed by a reflection interface 10 of the optical structure 6. Consequently, the light beams are emitted from a second boundary surface 11 of the substrate 2 opposite the first boundary surface 3.

FIG. 7 schematically shows a fourth embodiment of the optical device 1. The fourth embodiment is similar to the third embodiment. Therefore, similar elements and elements serving similar functions are indicated by the same reference numerals as in the context of the third embodiment and only the differences are pointed out.

The fourth embodiment differs from the third embodiment in that there is provided for a transmission interface 18 instead of a reflection interface 10. Therefore, the light beams are emitted from the optical device 1 in the opposite direction.

The invention claimed is:

1. Optical device for controlling light comprising
a substrate, wherein a surface of the substrate constitutes a boundary surface and wherein a region of the substrate contacting the boundary surface constitutes a border region,
a waveguide formed within the substrate for guiding a light beam, and
an optical structure,
wherein the waveguide bends towards the boundary surface of the substrate for directing the light beam at the optical structure, wherein the border region is arranged at least partially in an optical path between the waveguide and the optical structure such that a light beam to be emitted from the waveguide towards the optical structure passes through the border region,
wherein
there is provided for a contact structure contacting the border region at the boundary surface, wherein the contact structure has a refractive index, which is lower than the refractive index of the substrate in the border region,
wherein the waveguide directs the light beam under an emitting angle at the boundary surface and a refractive index difference of the refractive index of the contact structure and the refractive index of the substrate in the border region is such that the critical angle of the boundary surface on the substrate's side is larger than the emitting angle, wherein the emitting angle and the critical angle are measured from a normal of the boundary surface.

2. The optical device according to claim 1, wherein a refractive index difference of the refractive index of the contact structure and the refractive index of the substrate in the border region is such that the critical angle of the boundary surface on the substrate's side is smaller than the critical angle of a boundary of the waveguide with the substrate on the waveguide's side, wherein the critical angle of the boundary surface is measured rom a normal of the boundary surface and the critical angle of the boundary of the waveguide is measured from a normal of the boundary of the waveguide.

3. The optical device according to claim 1, wherein the contact structure has a different refractive index than a material of the optical structure.

4. The optical device according to claim 1, wherein the optical structure comprises a reflection interface for reflecting the light beam directed at the optical structure by the waveguide, towards the boundary surface of the substrate, wherein the reflection interface is optionally provided by a reflective coating.

5. The optical device according to claim 1, wherein the optical structure comprises a transmission interface different from the boundary surface of the substrate arranged such that the light beam directed at the optical structure is emitted from the transmission interface.

6. Backlight unit comprising the optical device according to claim 1.

7. The optical device according to claim 1, wherein the optical structure comprises an optical shaping unit and the waveguide is configured for directing the light beam at the optical shaping unit, wherein the optical shaping unit is configured to reduce the beam divergence of the light beam directed at it.

8. The optical device according to claim 7, wherein
the optical shaping unit is a first optical shaping unit and
the optical structure comprises at least a second optical shaping unit and the second secondary waveguide directs the light beam at the second optical shaping unit, wherein the second optical shaping unit is configured to reduce the beam divergence of the light beam directed at it.

9. Optical device for controlling light comprising
a substrate, wherein a surface of the substrate constitutes a boundary surface and wherein a region of the substrate contacting the boundary surface constitutes a border region,
a waveguide formed within the substrate for guiding a light beam, and
an optical structure,
wherein the waveguide bends towards the boundary surface of the substrate for directing the light beam at the optical structure, wherein the border region is arranged at least partially in an optical path between the waveguide and the optical structure such that a light beam to be emitted from the waveguide towards the optical structure passes through the border region,
wherein there is provided for a contact structure contacting the border region at the boundary surface, wherein the contact structure has a refractive index, which is lower than the refractive index of the substrate in the border region,
wherein the optical device further comprises a primary waveguide formed within the substrate for receiving a light beam from an external light source, wherein the primary waveguide is connected or coupled to the waveguide.

10. The optical device according to claim 9, comprising the external light source.

11. The optical device according to claim 9, wherein the primary waveguide comprises an interface for receiving the light beam from the external light source and the primary waveguide extends from the interface substantially parallel to the boundary surface.

12. The optical device according to claim 9, wherein the waveguide is a first secondary waveguide and the optical device further comprises at least a second secondary waveguide formed within the substrate for guiding a light beam, wherein the primary waveguide is coupled to the second secondary waveguide and the second secondary waveguide bends towards the boundary surface of the substrate for directing the light beam at the optical structure at a different position than the first secondary waveguide.

13. The optical device according to claim 9, comprising at least a further primary waveguide formed within the substrate for receiving a light beam from at least a further external light source, wherein the further primary waveguide is connected to or coupled to at least a further waveguide formed within the substrate for guiding a light beam, wherein the further waveguide bends towards the boundary surface of the substrate for directing the light beam at the optical structure.

14. Optical device for controlling light comprising
a substrate, wherein a surface of the substrate constitutes a boundary surface and wherein a region of the substrate contacting the boundary surface constitutes a border region,
a waveguide formed within the substrate for guiding a light beam, and
an optical structure,
wherein the waveguide bends towards the boundary surface of the substrate for directing the light beam at the optical structure, wherein the border region is arranged at least partially in an optical path between the waveguide and the optical structure such that a light beam to be emitted from the waveguide towards the optical structure passes through the border region,
wherein there is provided for a contact structure contacting the border region at the boundary surface, wherein the contact structure has a refractive index, which is lower than the refractive index of the substrate in the border region,
wherein a refractive index difference of the refractive index of the contact structure and the refractive index of the substrate in the border region is between 0.0001 and 0.1.

* * * * *